United States Patent [19]

Cook

[11] Patent Number: 4,544,825

[45] Date of Patent: Oct. 1, 1985

[54] ADAPTIVE CONTROL SYSTEM FOR WELDING INVERTED SEAMS

[75] Inventor: George E. Cook, Brentwood, Tenn.

[73] Assignee: CRC Welding Systems, Inc., Nashville, Tenn.

[21] Appl. No.: 455,893

[22] Filed: Jan. 5, 1983

[51] Int. Cl.[4] .................................... B23K 9/12

[52] U.S. Cl. .................... 219/137 R; 219/124.22; 219/124.34; 219/125.12

[58] Field of Search .................. 219/125.12, 124.22, 219/124.34, 130.5, 137 R

[56] References Cited

U.S. PATENT DOCUMENTS

| | | | |
|---|---|---|---|
| 3,646,309 | 2/1972 | Smith, Jr. . | |
| 3,775,581 | 11/1973 | Sciaky . | |
| 3,777,115 | 12/1973 | Kazlauskas . | |
| 3,818,176 | 6/1974 | Brown | 219/125.12 |
| 3,851,137 | 11/1974 | Verhagen . | |
| 3,904,846 | 9/1975 | Risberg . | |
| 4,019,016 | 4/1977 | Friedman . | |
| 4,095,077 | 6/1978 | Schneider . | |
| 4,151,395 | 4/1979 | Kushner et al. . | |
| 4,158,124 | 6/1979 | Connell . | |
| 4,188,525 | 2/1980 | Merrick . | |
| 4,293,758 | 10/1981 | Slavens et al. | 219/125.12 |
| 4,302,655 | 11/1981 | Edling . | |
| 4,302,656 | 11/1981 | Poth . | |
| 4,316,075 | 2/1982 | Isoya . | |

FOREIGN PATENT DOCUMENTS

| | | | |
|---|---|---|---|
| 3001346 | 8/1980 | Fed. Rep. of Germany | 219/125.12 |
| 1517481 | 7/1978 | United Kingdom . | |
| 612761 | 6/1978 | U.S.S.R. | 219/125.12 |

*Primary Examiner*—Clifford C. Shaw

*Attorney, Agent, or Firm*—Jones & Askew

[57] ABSTRACT

Method and apparatus for welding edge joints such as turbine blades and the like, including adaptive tracking circuitry for maintaining the center of oscillation of the welding electrode substantially aligned with the center of the workpiece as the electrode is moved along the workpiece, and means for adjusting welding parameters such as welding current to prevent melt over of the edge and wirefeed rate to control overlay height as the welding electrode approaches to within a predetermined distance from the edge of the workpiece. The disclosed embodiment samples the arc signal, processes the arc signal to remove undesirable noise components, uses the processed signal to adaptively position the electrode with respect to the workpiece, and controls the welding parameters related to overlay height when the sensed position of the electrode reaches a predetermined distance from the edge of the workpiece.

33 Claims, 7 Drawing Figures

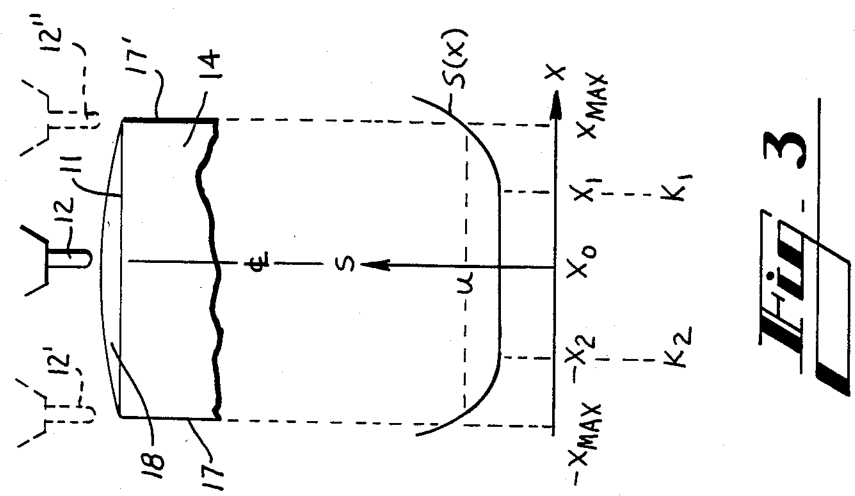
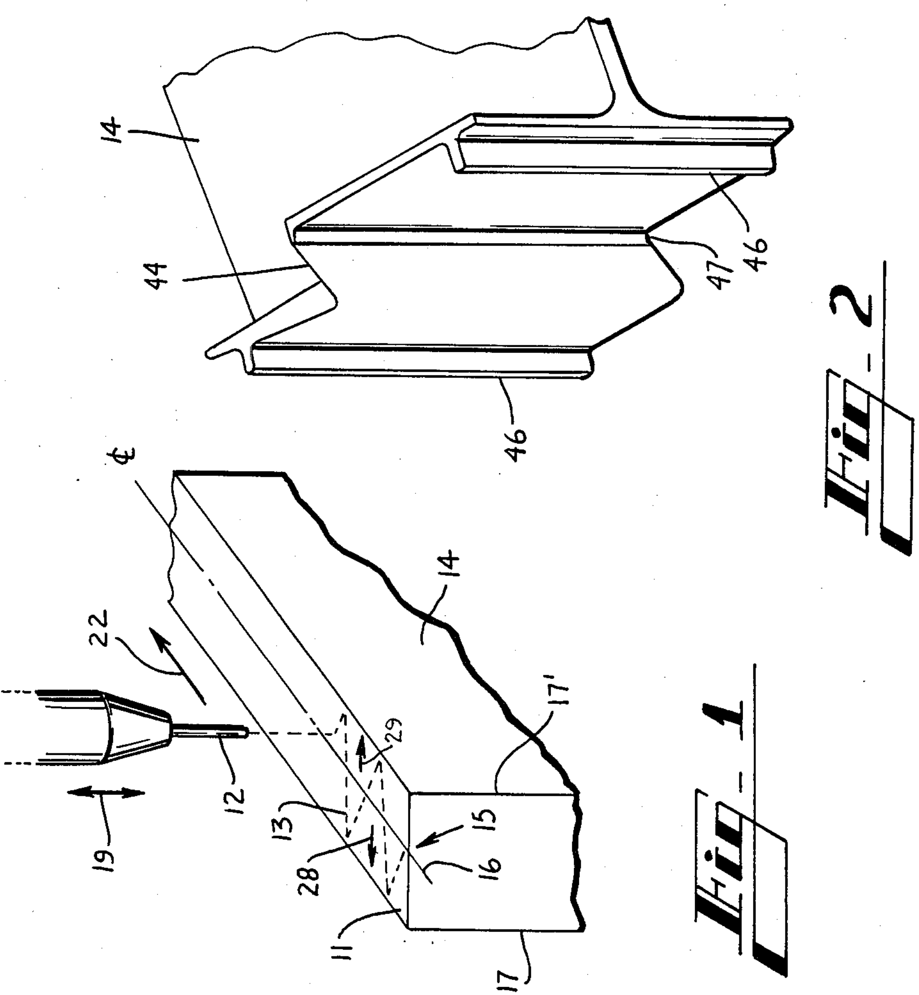

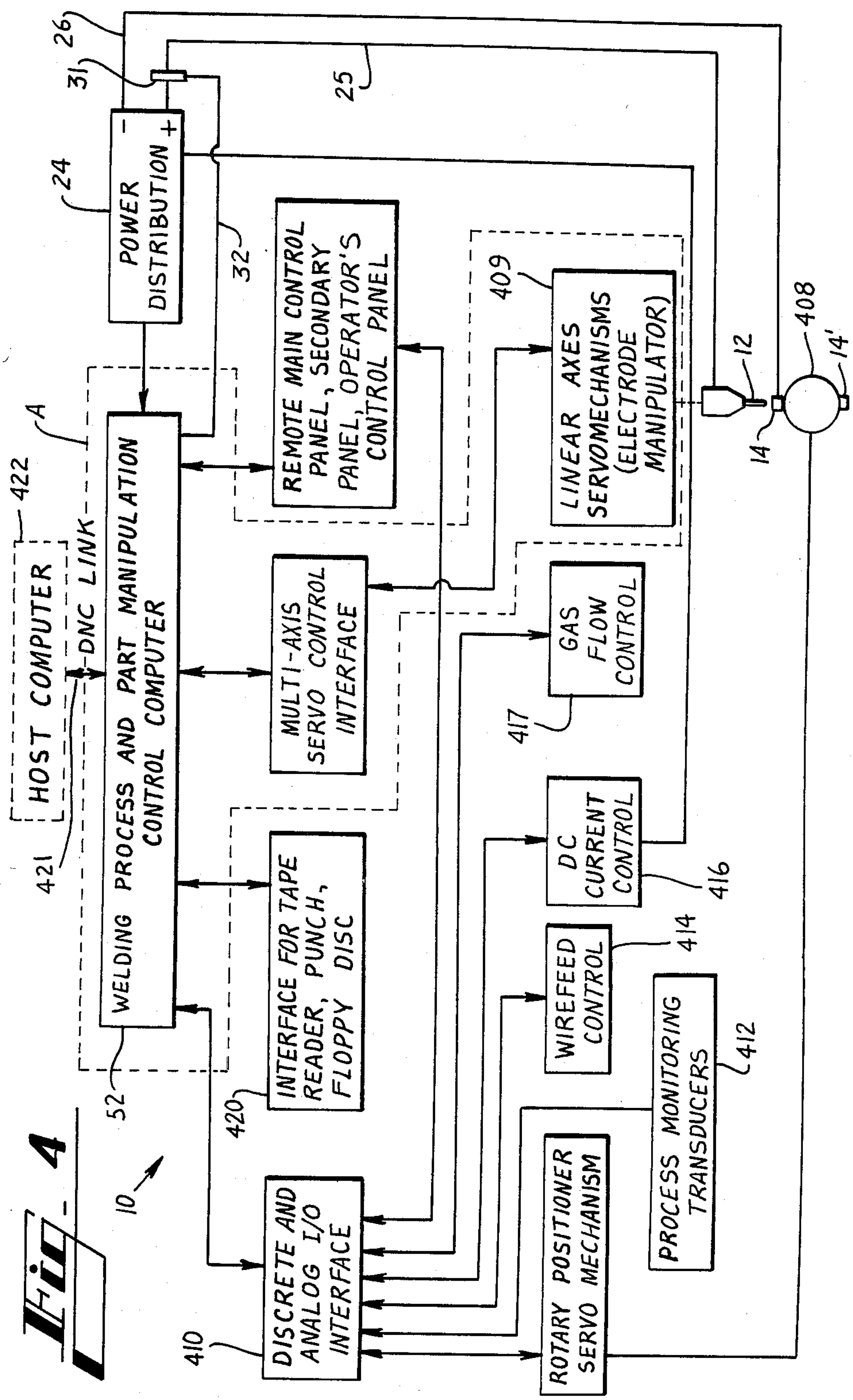
Fig. 4
10
POWER DISTRIBUTION
24
26
31
25
32
HOST COMPUTER
422
DNC LINK
421
A
WELDING PROCESS AND PART MANIPULATION CONTROL COMPUTER
52
REMOTE MAIN CONTROL PANEL, SECONDARY PANEL, OPERATOR'S CONTROL PANEL
MULTI-AXIS SERVO CONTROL INTERFACE
INTERFACE FOR TAPE READER, PUNCH, FLOPPY DISC
420
DISCRETE AND ANALOG I/O INTERFACE
410
LINEAR AXES SERVOMECHANISMS (ELECTRODE MANIPULATOR)
409
GAS FLOW CONTROL
417
DC CURRENT CONTROL
416
WIREFEED CONTROL
414
PROCESS MONITORING TRANSDUCERS
412
ROTARY POSITIONER SERVO MECHANISM
12
408
14
14'

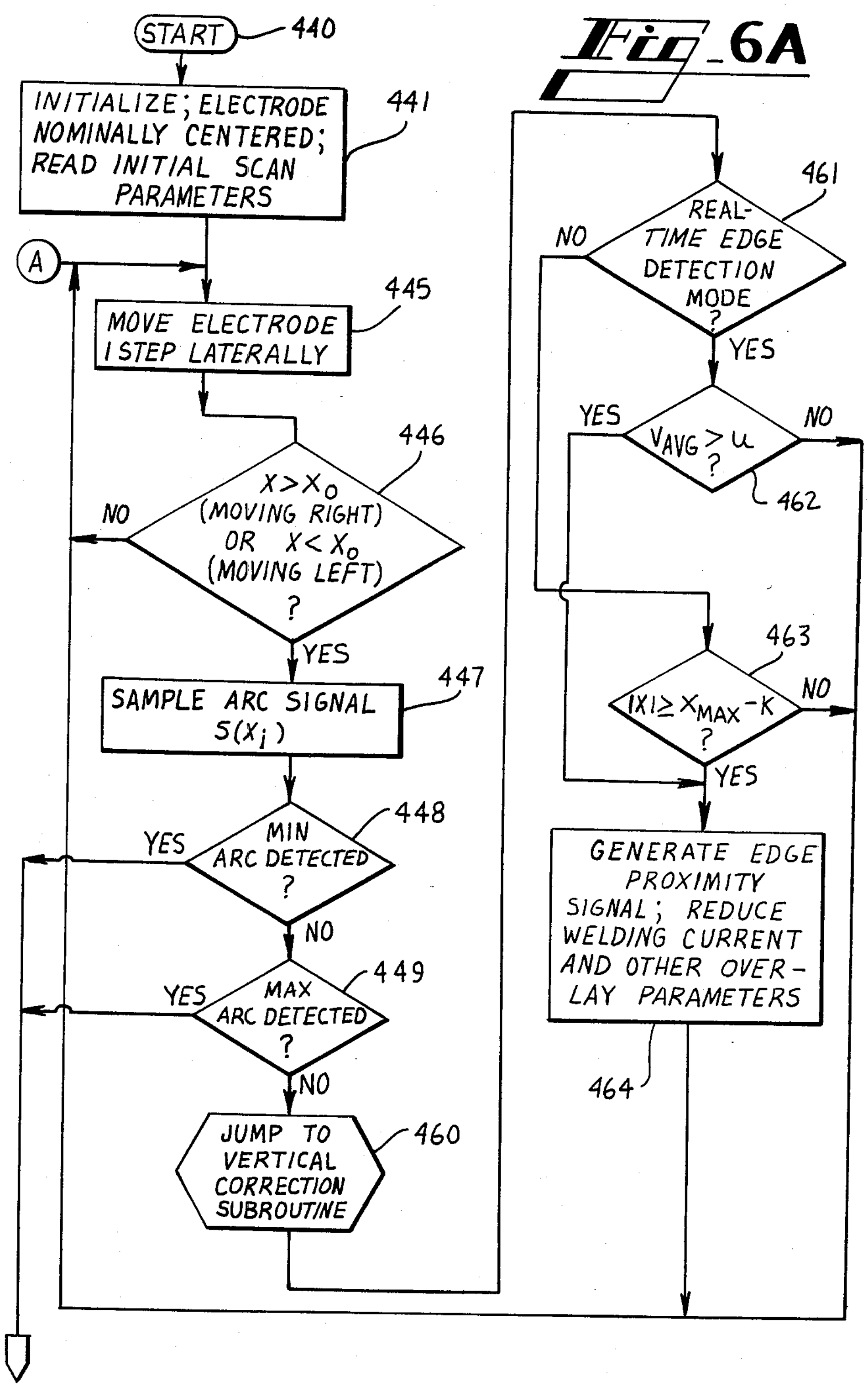

Fig_6A
START
440
INITIALIZE; ELECTRODE NOMINALLY CENTERED; READ INITIAL SCAN PARAMETERS
441
A
MOVE ELECTRODE 1 STEP LATERALLY
445
X>X0 (MOVING RIGHT) OR X<X0 (MOVING LEFT) ?
446
NO
YES
SAMPLE ARC SIGNAL S(Xi)
447
MIN ARC DETECTED ?
448
YES
NO
MAX ARC DETECTED ?
449
YES
NO
JUMP TO VERTICAL CORRECTION SUBROUTINE
460
REAL-TIME EDGE DETECTION MODE ?
461
NO
YES
VAVG > u ?
462
YES
NO
|X| ≥ XMAX - K ?
463
NO
YES
GENERATE EDGE PROXIMITY SIGNAL; REDUCE WELDING CURRENT AND OTHER OVER-LAY PARAMETERS
464

ADAPTIVE CONTROL SYSTEM FOR WELDING INVERTED SEAMS

BACKGROUND

1. Field of the Invention

The present invention relates generally to arc welding control systems, and relates more particularly to adaptive welding systems which sense the characteristics of an inverted seam or flange weld such as the edges of turbine blades and the like in order to adjust the center line of oscillation of the welding electrode and other welding parameters as the electrode is moved along the inverted seam.

2. Description of the Prior Art

Recent times have seen drastic improvements in adaptive arc welding systems which sense the position of a welding electrode relative to a joint being welded and guide the electrode along the seam during the welding process. Marked improvement in techniques for obtaining position information from the highly noisy arc voltage or current signal has led to attempts to develop control systems which sense the characteristics of the seam being welded by sensing and analyzing a parameter of the welding arc.

There is presently a particular need for an adaptive control system which successfully adapts to a classic edge joint for flange welds. An "edge joint" is in actuality an "inverted" seam and may be defined as a joint between the edges of two or more parallel or mainly parallel members. The weld on an edge joint is typically called a "flange weld", and requires that the welding electrode be moved longitudinally along the edge joint of workpiece while maintained substantially above the surface to be welded.

In addition to welding two members in a classic edge joint, it is also frequently desired to weld-overlay or hard-surface a single edge for the purpose of hard facing or building up in a remanufacturing process. For example, the remanufacturing of turbine blades and vanes by weld overlay allows re-use of the expensive blades and vanes. For purposes of the discussion which follows, the terms "edge joint", "flange weld", and "inverted seam" are used interchangeably and mean any workpiece having a convex lateral geometry.

A typical aircraft gas turbine engine can contain over 4,000 air foils, making the air foils or blades the most numerous component in the engine. Since the turbine engine's performance is directly related to the temperature under which it can operate, turbine blades and vanes are designed with high temperature operation as an objective. Progress in turbine blade materials such as the super alloys has moved from air melting, to vacuum melting, and then to directional solidification fabrication techniques. Progress in turbine vane materials has shown a similar trend with a move from investment case alloys to dispersion strengthened alloys.

In addition to these material considerations, turbine blades and vanes must be manufactured to very tight contour tolerances. Turbine blades and vanes vary considerably in dimension and typically include a twist around a longitudinal axis as great as four degrees. The blades and vanes with their compound curves, thin cross-sections, and lack of flat holding surfaces are difficult to fixture securely and hold to required tolerances during machining.

The net result of all of these design and manufacturing considerations is a high initial manufacturing cost. It is therefore desirable to remanufacture the worn blades and vanes rather than discard them and replace with new blades and vanes.

Prior to the present invention, it had been thought that techniques for adaptively sensing a workpiece through the welding arc itself required distinct features of the workpiece such as sidewalls to be present in order for the control system to adaptively track the welding electrode along the workpiece. Absence of such workpiece features in articles such as turbine blades and vanes led those involved in research and development in adaptive welding control to concentrate their efforts towards controlling welding for workpiece types possessing more readily sensable features.

SUMMARY OF THE INVENTION

It has now been discovered that the welding arc itself may successfully be employed to sense the absence of sidewalls of a workpiece, and that the presence of predefined sharp features such as a distinct sidewalls is not required in order to adaptively sense and weld edge joints or inverted seams. The discovery embodied in the present invention is that there are distinct changes in the arc current and/or voltage prior to extinguishment of the arc because of movement of the electrode away from the edge of the workpiece, and that these distinct changes may be sensed in real time and used in adaptive electrode positioning.

The present invention is particularly suited for use in arc welding apparatus which includes devices for oscillating the electrode laterally across a workpiece about a center reference point and for moving the electrode longitudinally along the workpiece possessing inverted seam characteristics. Briefly described, the improvement of the present invention includes circuitry for sensing at least a portion of the lateral profile of a workpiece possessing inverted seam characteristics while the electrode is moving laterally across the workpiece, circuitry responsive to the sensed lateral profile for adjusting a welding parameter (such as welding current) related to the overlay depth when the electrode is sensed to reach a predetermined lateral distance from the center reference point, and adaptive tracking control circuitry, also responsive to the sensed lateral profile, for adjusting position parameters (such as the location of the oscillation center) of the electrode as the electrode is moved longitudinally along the workpiece.

In particular, the welding parameter adjusted when the electrode reaches the predetermined lateral distance from the center is the welding current, which is reduced to a nondestructive level as the edge is approached to prevent melting over the edges of the workpiece. Additionally, the rate of feed of the consumable wire fed into the weld pool is reduced when the electrode passes the predetermined lateral distance to reduce the overlay height towards the edge of the workpiece.

The tracking control circuitry disclosed herein adjusts the location of the center reference point of oscillation so that the center of oscillation is maintained substantially along the centerline of the workpiece as the electrode is moved longitudinally along the workpiece. In the disclosed embodiment, circuitry is disclosed for sensing through the welding arc itself the lateral profile of the workpiece and for comparing at least a portion of the sensed lateral profile of the workpiece to a predetermined reference, and for providing an error signal as a function of the difference between the portion of the sensed lateral profile and the reference. Control circuitry responsive to the error signal then adjusts position parameters of the electrode such as the location of the center of oscillation and the width of oscillation.

The present invention also includes circuitry for detecting when the electrode has reached a predetermined lateral distance from the present center of oscillation. This circuitry provides an edge proximity signal which is used as a control signal to reduce the welding current as the electrode approaches the edge. Two techniques for generating the edge proximity signal are disclosed.

Briefly described, the method of the present invention includes the steps of (1) moving the arc electrode along a path on the surface of the workpiece, the path being defined by projecting a line from the end of the electrode to intersect perpendicularly with a point on the surface, (2) measuring a parameter of the weldng arc in order to derive an arc signal having a magnitude related to the vertical distance between the electrode and the surface of the workpiece as the electrode is moved along the path, (3) repeatedly storing in a memory a plurality of samples of the arc signal which correspond to a predetermined portion of the path of the electrode, (4) detecting when the electrode has been moved along the path to a predetermined distance from the edge of the convex surface of the workpiece and providing an edge proximity signal, (5) responsive to the edge proximity signal, reducing the welding current provided to the electrode while the electrode exceeds the predetermined distance from the center and approaches the edge of the workpiece to prevent melting down of the edge, (6) processing the samples of the arc signal so as to determine when the electrode has approached to within a second predetermined distance from the edge of the workpiece, and (7) changing the direction of movement of the electrode along the path when the electrode has approached to within the second predetermined distance from the edge. The direction of movement of the electrode is thus changed whenever the sensed arc signal or variables related to the sensed arc signal exceed predetermined maximum values which are indicative that the electrode is about to traverse laterally beyond the edge of the workpiece. Thus, the step of moving the electrode along a path comprises oscillating the electrode about a nominal center line as the electrode is moved along the surface of the workpiece, adaptively positioning the electrode with respect to the workpiece and edge, and controlling welding variables related to overlay height as the electrode approaches the edge to control overlay height and prevent melting over of the edge.

Two embodiments of the present invention are disclosed herein, the first of which is adapted for use in connection with a five axis computer numerical control manipulator which includes rotary positioners for holding a plurality of turbine blades. The rotary positioners successively position a series of turbine blades for overlay by the welding electrode while the other positioner is unloaded and loaded with new parts to be remanufactured.

A second embodiment employs circuitry disclosed in application Ser. No. 397,006, filed July 19, 1982, entitled "Sidewall-Matching Adaptive Control System for Welding", and Ser. No. 380,222, filed May 20, 1982, entitled "Template-Matching Adaptive Control System for Welding", and application Ser. No. 422,369, filed Sept. 23, 1982, entitled "Apparatus and Method for Sensing a Workpiece with an Electrical Arc", the disclosures of which are incorporated herein by reference and made a part hereof.

Accordingly, an important object of this invention is to provide an improved adaptive welding control system which is operable with edge joints, flange welds, and the like.

Another object of the present invention is to provide a means and method of adaptively controlling a welding arc for purposes of building up material on inverted workpieces such as turbine blades and the like, by automatically reducing the welding current as the arc electrode approaches the edge of the workpiece in order to prevent melt-down of the edge.

Another object of this invention is to provide a means and method wherein systems for adaptively tracking welding seams may be successfully used to adaptively track and weld inverted workpieces such as turbine blades and the like.

Another object of this invention is to provide a means and method for adaptively controlling the welding of complex edge joints by sensing the lateral geometry of the workpiece through the welding arc itself and reversing the direction of oscillation of the electrode when the electrode approaches to within a predetermined distance of the edge of the workpiece.

Another object of the present invention is to employ techniques for adaptively positioning a welding electrode with respect to a workpiece for use in controlling parameters related to overlay depth, such as welding current, so that the overlay depth may be controlled near the edges of the workpiece without melting over the edge.

These and other objects and advantages of the present invention may be more clearly understood and appreciated from a review of the following detailed description of the disclosed embodiments and by reference to the appended drawings and claims.

BRIEF DESCRIPTION OF THE DRAWINGS

FIG. 1 illustrates an example of the path traversed by a welding electrode on an edge joint.

FIG. 2 illustrates classical edge joints found in a typical turbine blade.

FIG. 3 illustrates arc voltage signal waveforms expected for a typical edge joint.

FIG. 4 is a block diagram of a first preferred embodiment of the present invention.

FIGS. 6A and 6B are flow chart diagrams of the general operation of the preferred embodiments.

DETAILED DESCRIPTION OF THE PREFERRED EMBODIMENT

Figure 5:
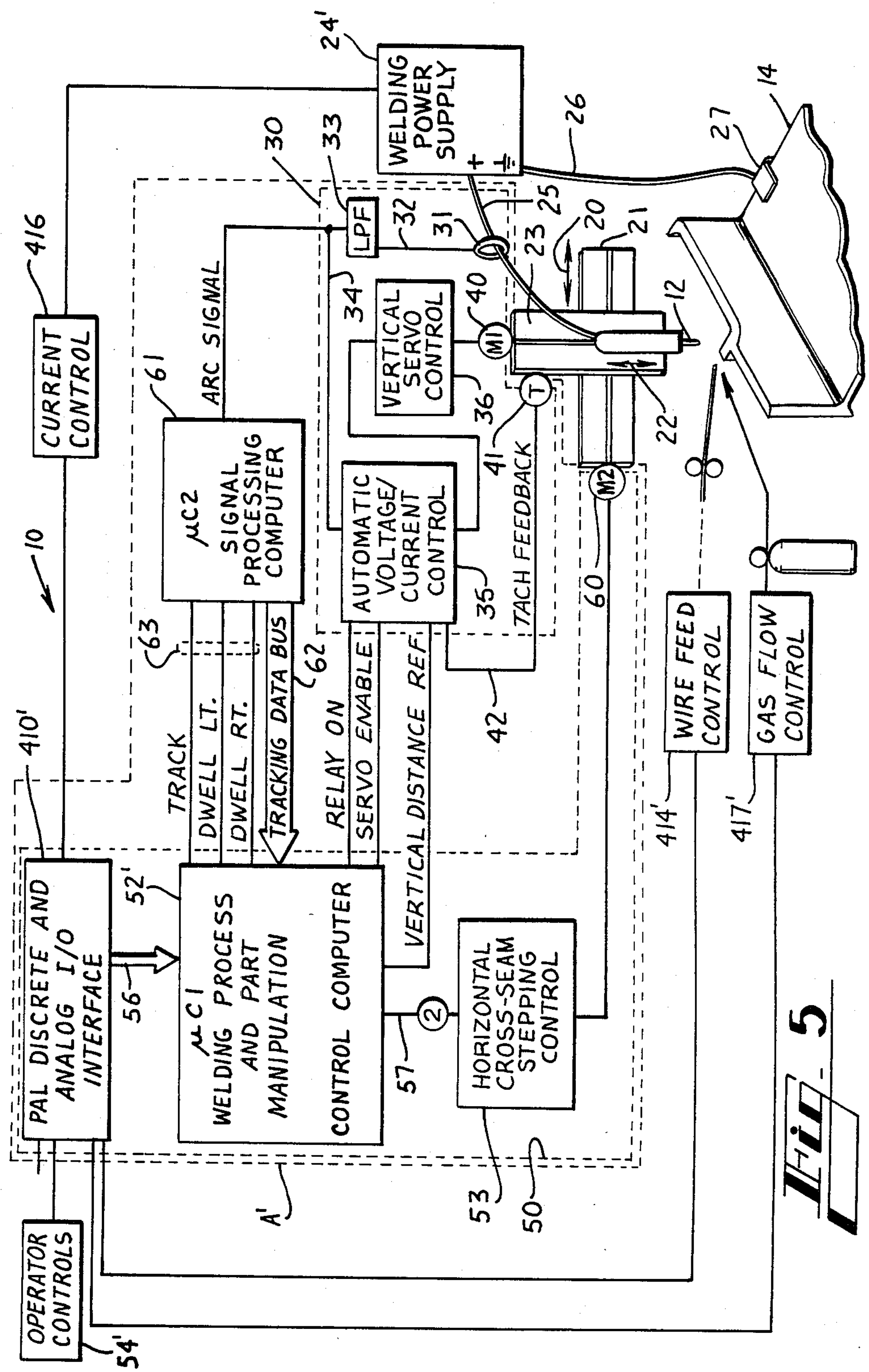
FIG. 5 is a block diagram of a second preferred embodiment of the present invention.

Referring now to the drawings, in which like numerals indicate like elements throughout the several views, FIG. 1 illustrates a representative workpiece 14 possessing characteristics which categorize it as an "edge joint", "inverted seam", or "flange weld" by virtue of edges 17, 17' which are displaced with respect to upper surface 11 of the workpiece at an angle of greater than 180 degrees. The upper surface 11 is the surface which is overlaid by welding with the techniques disclosed herein.

Information relating to the vertical spacing of the welding electrode 12 above the upper surface 11 is obtained in the preferred embodiment from the welding arc generated between the electrode and the surface.

The disclosed embodiment derives electrode position relative to the workpiece 14 by digitally processing the arc current or voltage signal. Depending upon the mode of operation, vertical and cross-seam correction values are periodically transmitted to position control servo mechanisms for the electrode, allowing the electrode to be adaptively positioned in response to unexpected changes in the topography of the workpiece. For purposes of the present application and for the above-referenced applications, "cross-seam" correction means the correction of the location of the nominal centerline of oscillation 16 of the electrode 12 as it scans or traverses the workpiece 14 during the weld.

FIG. 2 shows the edge joints involved in a typical welding repair for a turbine blade. The repairs involve the application of welding overlays on shroud faces 44, notch faces 47, and radial air seals 46. A design requirement for repairing turbine blades is that the welding machine be able to automatically weld any combination of these surfaces. A further design requirement of the welding machine is that it be capable of applying a preselected overlay thickness for each notch, shroud, and air seal surface of each blade type. Typically, the specified overlay thickness range varies between 0.5 to 1.75 millimeters.

In welding edge joints of the type illustrated in FIG. 2, it is necessary that the electrode be moved along the surface of the workpiece in order to build up the surface of the workpiece in a satisfactory manner. The electrode is placed into proximity with the workpiece, the welding arc is struck, and then movement of the electrode occurs along a path which is defined by the limits of oscillation. In FIG. 1, the path of travel 13 of the electrode is defined on the upper surface 11 by projecting a line from the end of the electrode to intersect perpendicularly with the surface 11 of the workpiece 14 as the electrode is moved.

It is also convenient to consider the movement of the electrode as an oscillation between extremes about a nominal centerline of oscillation. In FIG. 2, the nominal centerline of oscillation is indicated at 16. If the oscillation of the electrode about the centerline 16 is begun at point 15, the movement of the electrode along the path 13 may be defined as movement in a first direction, indicated by the arrow 28, until an extreme of oscillation is reached, as when the edge 17 of the workpiece is sensed or encountered, followed by movement of the electrode in a second direction, indicated by the arrow 29, which crosses the centerline 16 and reaches a second extreme of movement at the opposite edge 17' of the workpiece. The movement of the electrode 12 in the direction of arrows 28, 29 is defined as lateral or "cross-seam", while the movement along centerline 16 in the direction of arrow 22 is defined as movement in the longitudinal direction. Movement of the electrode in the direction of arrows 19 towards and away from the upper surface 11 of the workpiece is defined as vertical movement.

A typical scan of the electrode involves moving the electrode in the first direction until the edge of the workpiece has been approached sufficiently closely so that further movement of the electrode over the edge is not desirable and would risk the extinguishment of the arc. The arc voltage or current signal has been discovered to manifest a marked change well prior to the point at which the electrode is actually vertically disposed above the edge of the workpiece. This is illustrated in FIG. 3. Accordingly, it is possible to detect the approach of the edge before the electrode reaches the edge, and thereby make any adjustments which are required near the edge.

In FIG. 3, the arc signal S(x) is obtained as the electrode moves from the position 12' to positon 12". The centerline of oscillation is indicated at $x_0$. The signal S(x), either voltage or current, depending upon the welding process used, is related to the lateral profile of the workpiece, as a function of the cross-seam coordinate x. The extremes of oscillation are indicated as $-x_{MAX}$, at the edge 17, and $x_{MAX}$ at the edge 17'. For gas tungsten arc welding (GTAW) and plasma arc welding (PAW), if the electrode is maintained at a constant vertical spacing above the upper surface 11 of the workpiece, the arc voltage will vary as shown by the signal S(x) in FIG. 3. It will be observed that the signal S(x) begins to increase prior to the point at which the electrode is actually vertically disposed over edges 17 or 17'.

In order to control welding parameters related to overlay height as the electrode approaches the workpiece edge, the preferred embodiment of the present invention generates an "edge proximity" signal, which provides an indication for further processng circuitry that the edge is approaching. The edge proximity signal is generated (1) as a function of the actual detection of the increase in the signal S(x), or (2) at a predetermined distance from the last-known edge of the workpiece.

First, the edge proximity signal can be generated when the electrode has reached a predetermined lateral distance from the last-established center of oscillation reference point. This technique allows reduction of the welding current for the edge-approaching movement of the electrode based upon the last-known sensed edge of the workpiece.

A second approach to generating the edge proximity signal comprises processing the real-time arc voltage or current signals in order to determine when the edge is approaching. In this approach, the parameters relating to overlay height are not adjusted until the edge is actually detected as approaching, as opposed to the former approach wherein the location of the last-known edge of the workpiece governs when the reduction of welding current and wire feed rate occur. In practice, unless the seam being welded possesses an extremely unusual geometry, the rapidity of oscillation insures that either technique will produce substantially the same end result.

The latter alternative, wherein the welding parameters are adjusted at a predetermined distance from the last-known edge of the workpiece, it is also illustrated in FIG. 3. Assuming that the system has stored in memory the lateral location of the edge last encountered (for example, the edge illustrated at 17 occurs at $-x_{MAX}$), the system can begin to adjust welding parameters when the electrode 12 reaches the lateral position $x_1$, which occurs prior to the location at which the signal S(x) increases due to the approach of the edge 17' at $x_{MAX}$.

FIG. 4 is a block diagram of a system 10 especially adapted for welding inverted seams such as illustrated in FIGS. 1-3. The preferred embodiment of the system 10 is a 5-axis computer numerical control manipulator/-positioner and plasma arc welding system for remanufacturing turbine blades and vanes in particular. For turbine blade remanufacture, the plasma arc welding (PAW) process is preferable for the overlay operation primarily because of its directional stability and focusing effect brought about by arc constriction, and exhibits relative insensitivity to variations in torch standoff distance. As will be understood by those skilled in the art, plasma arc welding is an electrical arc welding process wherein coalescence is produced by heating with a constricted arc generated between an electrode and the workpiece and through a constricting nozzle. Typically, the electrode is recessed within the constricting nozzle so that the arc is collimated and focused by the constricting nozzle on a relatively small area of the workpiece. Because the shape of the arc is essentially cylindrical, there is very little change in the area of contact of the arc with the workpiece as the electrode standoff varies.

It will be understood that an orifice gas passes through a plenum chamber of the plasma arc torch, is heated by the arc, expands, and exits through the constricting orifice at an accelerated rate. If the orifice gas jet is sufficiently powerful, the plasma arc torch can cause cutting or turbulence in the weld puddle. Gas flow rates are typically held to within 1.5 to 15 liters per minute (3 to 30 cubic feet per hour).

Orifice gas alone is often not generally adequate to shield the weld pool from atmospheric contamination. Therefore, an auxiliary shielding gas is frequently provided in PAW through an outer gas nozzle. Typical shielding gas flow rates are in the range of 10 to 30 liters per minute (20 to 60 cubic feet per hour). It will thus be appreciated by those skilled in the art that rates of both orifice gas and shielding gas should be controlled as the electrode approaches the edge of the workpiece to prevent the gases from deforming the material of the workpiece, which has been softened by the heating of the electrode.

For turbine blade remanufacture, it is preferable to use a small orifice to improve the directional stability of the plasma jet. A conventional gas tungsten arc may also be used for turbine blade remanufacture; however, it tends to be deflected by low-strength magnetic fields since a gas tungsten arc is attracted to the nearest ground connection. A plasma jet on the other hand is comparatively stiff and tends to go in the direction in which it is pointed and is relatively impervious to magnetic fields. Consequently, a plasma arc offers better control over the arc energy for turbine blade repair. The degree of arc collimation, arc force, energy density on the workpiece and other characteristics are primarily functions of parameters such as plasma current, orifice diameter and shape, type of orifice gas, and flow rate of orifice gas. Of these welding parameters, plasma current and flow rates of orifice gas are most easily controlled with the present invention.

It will not be appreciated that the control of the welding arc depends in large part upon the relationship of the above mentioned four parameters. For overlay welding on turbine blades, a low plasma jet velocity is preferable to prevent weld metal expulsion from the workpiece. Low velocity is provided by large orifices, lower gas flow rates, and lower transferred arc currents. It will also be appreciated that control over these parameters may require adjustment as the edges of the workpiece are approached by the electrode to prevent expulsion and deformation of the workpiece.

The system 10 illustrated in FIG. 4 includes means to manipulate the electrode, means to position parts to be overlaid, current control means to control the upslope and downslope of weld current levels, and means to control filler wire speed; the system thus controls the complete sequencing of the overlay operation. The welding system automatically welds any desired preprogrammed combination of notch faces, shroud faces, and air seals on turbine blades or on turbine vanes. A conventional rotary positioner 408 is employed to permit an operator to be unloading or loading a workpiece 14' while another workpiece 14 is being welded by the system.

An electrode manipulator 409 includes three rectilinear axes servomechanisms. Both the rectilinear axes servomechanisms of the manipulator 409 and the rotary positioner are coordinated for constant weld travel speed. Each linear axis of manipulator 409 is driven from a DC motor drive coupled with absolute position encoders for position control. Tachometer feedback is employed on each axis for stabilization. In order to handle most types and sizes of turbine components, the allowable movement of the rectilinear axes is at least 610 millimeters in the x direction (the x-axis being shown in FIG. 3), at least 460 millimeters in the y direction (the direction of arrow 19 in FIG. 2), and at least 300 millimeters in the z direction (the direction of arrow 22 in FIG. 2). A load capacity of 70 kilograms is sufficient for the servomechanism drives for most turbine blade applications. Such electrode manipulators are known in the art.

The central controller of the preferred embodiment is a sixteen-bit computer 52 having 32 kilowords of memory capacity. With such a configuration, a weld schedule for up to 50 different parts may be stored with each part having up to 9 different welds. Preferably, the computer 52 includes such features as memory parity check, multiply/divide, power failure detection and automatic restart.

Communication with the computer 52 is provided through a discrete and analog input/output interface 410. Through interface 410, computer 52 is able to monitor the welding through conventional process monitoring transducers 412, as well as control the wirefeed rate through wirefeed control 414 and the welding power supply through DC current control 416.

In the preferred embodiment, two independent filler wirefeeders are used to provide overlaying the notch face on turbine blades with a different material than the material overlaying the air seal and shroud faces. The wire drive unit (not illustrated) includes four geared drive rolls which are driven by a stepper motor through a single pinion. The drive rolls are preferably equipped with replaceable polyurethane driving surfaces, and should accommodate a wire size range from between 0.5 millimeters to 2.4 millimeters. A wire guide manipulator (not illustrated) is also provided and preferably allows adjustment of a wire guide tip in four axes—angularly in a horizontal and vertical plane, and linearly in a vertical and axial direction. Those skilled in the art will appreciate that conventional wire guide subsystem can easily be adapted for control by wirefeed control 414.

The employment of a stepper motor for wirefeeders allows pulsed current weld schedules wherein the wirefeeder is pulsed between two preselected wirefeed speeds in synchronization with the high and low weld current pulses. Preferably, the stepper motor should be chosen so that at least 10 pulses per second are possible.

A conventional controllable welding power supply 24 provides power to the electrode 12 for welding. During the starting and stopping modes of the welding process, it is frequently necessary to slope the welding current from minimum to weld level at the beginning of the workpiece, and from weld level to minimum at the termination of the workpiece. A typical sloping ranges between 0 to 10 seconds and is a linear ramp. The DC current control 416 allows control of the welding current for pulsing applications as well as for continuous welding and upslope and downslope of welding current. A welding power supply rated at 300 amperes DC at 40 volts regulated by three-phase SCR bridge and which provides upsloping and downsloping of weld current is employed in the preferred embodiment.

The preferred embodiment of the system 10 also includes interfaces for external peripherals such as a tape reader or floppy disk. A conventional external peripheral interface 420 allows data to be input to the system for setting initial parameters for particular components to be remanufactured.

The preferred embodiment further includes a direct numerical control (DNC) interface link 421, preferably a serial RS-232C or a parallel RS-408 standard communication link, which allows the welding process computer 52 to communicate with a host computer 422 of a robot or other external system.

In order to adapt the position of the electrode 12 with respect to the workpiece 14, the arc voltage signal is used as a position sensor to effect real time feedback corrections to compensate for part variations. The basic control strategy involves oscillating the electrode laterally transverse to the longitudinal direction of travel along the workpiece, as illustrated in FIG. 3. This movement imposes a forced variation in the arc length which is particularly prominent at and near the surface edges. The variation in the arc length manifests itself in the arc voltage and/or current, and allows cross-seam and vertical position information to be gleaned.

To obtain the cross-seam electrode position relative to the surface center line, the arc voltage is sampled and stored as a function of the cross-seam position. Signals from the electrical arc generated between the electrode 12 and the workpiece 14 are detected by an arc-current-/voltage detector 31 and are provided along line 32 to the computer 52. The arc-current/voltage detector 31 in the preferred embodiment comprises a Hall-effect sensor well known to those skilled in the art.

Techniques for processing the samples of the arc signal taken during the lateral movement of the electrode are discussed in detail in the pending application Ser. Nos. 422,369, 397,006, and 380,222, the disclosures of which have been incorporated herein by reference. After the following discussion, those skilled in the art will understand how to program computer 52 to adaptively position the electrode 12 with respect to the workpiece 14.

In order to adapt the techniques disclosed in the above-referenced patent applications for successful adaptive tracking of inverted seams, the programmer must bear in mind that the voltage signal, when processed as disclosed in the adaptive tracking schemes, will begin to increase as the edge is approached. Consequently, in order to prevent expulsion of weld material and melting over of the edges, the welding current should be reduced at a predetermined distance from the edge of the workpiece, and in some applications the gas flow rates should also be reduced.

In many applications, it is possible to adjust these parameters to appropriate levels when the increase in the arc current is detected. In other applications, however, it may be necessary to reduce the gas flow rate, wirefeed rate, or welding current prior to the point at which the arc voltage actually begins to increase. For example, with extremely narrow workpieces, the force of the welding plasma can cause expulsion of weld material over the edge of the workpiece prior to the actual drop-off of the arc along the side of the workpiece. In such cases, the welding parameters should be reduced at a predetermined distance from the last-known edge of the workpiece. This is accomplished in the preferred embodiment by recording the location of the edge of the workpiece on the immediately-preceding oscillation, and by beginning the adjustment of the welding parameter when the electrode has reached a predetermined distance from this last-known edge. Those skilled in the art will understand how to program computer 52 to accomplish the adaptive tracking disclosed in the above-referenced pending applications by following the adaptive tracking flow-charted routines disclosed therein.

FIG. 5 is a block diagram of circuitry disclosed in application Ser. Nos. 380,222 and 397,006 which with certain minor modifications may be arranged to accomplish edge joint tracking as disclosed herein. The elements identified in the aforementioned patent applications are the same as shown in FIG. 5, with only minor modifications which are described below. In particular, the circuitry shown enclosed by the dotted relief at A' in FIG. 5 may be substituted for the blocks shown enclosed in dotted relief indicated at A in FIG. 4. With this relationship between operative blocks in mind, those skilled in the art will understand how to adapt the circuitry and techniques disclosed in these patent applications for edge joint tracking.

The modifications between the apparatus disclosed in FIG. 5 hereof and the apparatus of FIG. 1 in the referenced patent applications includes substituting discrete and analog I/O interface 410' for the analog data acquisition circuitry 51 of the reference copending applications. Rather than the use of a single oscillation control microcomputer 52 in the copending patent applications, a larger and more powerful computer 52' may be employed. Initial parameter inputs are provided from operator controls 54' through interface 410 as opposed to an operator control pendant 54.

Interface 410 also provides signals from the computer 52' to a wirefeed control 414', the current control 416', and gas flow control 417' as discussed above. The remainder of the components shown in FIG. 5 are arranged and operate as discussed in connection with the referenced copending patent applications.

Operation

Figure 6B:
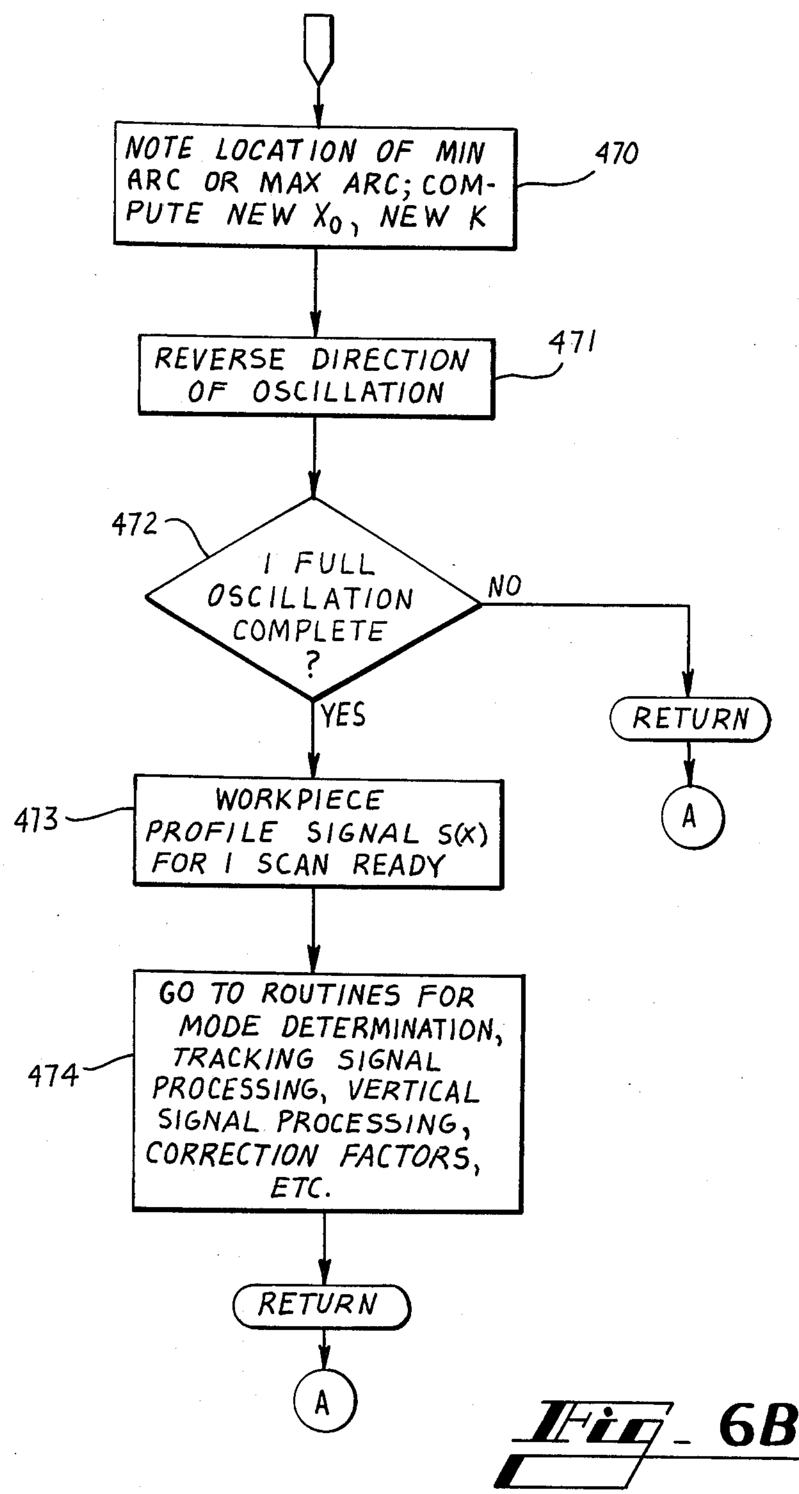

FIG. 6 is a general flowchart diagram of the method whereby the objects of the present invention may be accomplished for the disclosed apparatus. Those skilled in the art will understand how to program welding process and part manipulation control computers 52 or 52' to accomplish the steps disclosed. It will be understood by those skilled in the art that the flowchart represents a possible series of steps which may be taken to accomplish the objectives of the present invention, and that other sequences of steps may be employed with success in accomplishing the positioning of the electrode, the detection of the edge of the workpiece, and the reduction of the welding parameters. Furthermore, it will be understood that the diagram shown in FIG. 6 may be implemented by means of hard-wired logic circuits in place of minicomputers, microprocessors, and the like while still successfully accomplishing the objectives of the invention.

Starting at 440 in FIG. 6, the computer 52 performs an initializing routine at 441, well-known to those skilled in the art, which resets the system and initializes switches and registers within the computer. A counter for keeping track of the number n of data samples is set so that n equals 1, the electrode is nominally centered at a starting point in proximity to the workpiece, and initial scan parameters such as a vertical distance reference, estimated width of the workpiece, and the like are provided through either a host computer 422 or other data source such as operator controls 54'.

A command then is provided from the host computer 422 or operator controls 54' to begin the welding operation. Upslope of the welding current if appropriate is begun. At 445, the electrode is moved one step laterally in an initial direction; for purposes of discussion, the electrode is assumed to begin movement in the left direction from the position shown at 12 in FIG. 3 toward the position 12'. Thus, the electrode has begun to move along a path laterally across the workpiece, and longitudinally along the centerline of the workpiece.

At 446, an inquiry is made whether the electrode has reached the centerline of oscillation $x_0$ when returning from an extreme of oscillation. This is to prevent confusion of data samples associated with the area of the workpiece to the left of the centerline with data samples associated with the area of the workpiece associated with the right of the centerline. If the electrode is moving towards the right as illustrated in FIG. 3, no data samples are taken until the x position is greater than $x_0$; when moving leftwardly, no data samples are taken until the x position is less than $x_0$. It should be understood, however, that in certain applications, some of which are discussed more fully in the referenced copending applications, it may be desirable to continue taking data samples while the electrode returns from an extreme towards the centerline, so as to obtain more data samples for use in subsequent processing. Thus, the inquiry at 446 is intended to be illustrative of the mode of operation wherein data samples are taken during the excursion towards the edge but not on the return towards the centerline.

At 447, a sample is taken of the ARC SIGNAL $S(x_i)$ and stored in computer memory. The arc signal $S(x_i)$ for plasma arc welding is a voltage signal, and it will be understood that the sampled signal is also designated by V(n) in the referenced patent application Ser. No. 422,369.

At decision blocks 448 and 449, the sampled signal $S(x_i)$ is compared to predetermined minimum and maximum acceptable levels. This comparison is essentially a "safety limit" determination made to insure that the vertical distance to the workpiece is not so short as to threaten the integrity of the electrode or so great as to suggest that the electrode has moved so far away from the workpiece or the edge thereof as to risk extinguishment of the arc. The minimum acceptable arc or "min arc" inquiry at 448 is manifested as a maximum current value or a minimum voltage value, depending upon the particular parameters sensed. The maximum acceptable arc or "max arc" inquiry at 449 is similarly preprogrammed.

If either the min arc or max arc has been detected, the program flow goes to 470, and the location of the min arc or max arc is noted for subsequent operations.

In the event that the safety limits are not impinged or the edge reached under the tests at 448 and 449, the program reaches block 460 wherein a subroutine entitled "vertical correction" is called and executed. This subroutine is discussed in the incorporated referenced patent application Ser. No. 422,369. Essentially, this subroutine computes the value of the arc signal average $V_{AVG}(n)$, which is the average of the arc signal for a predetermined number n of arc signal samples. Additionally, inquiries are made in this subroutine whether the apparatus is operating in the vertical only mode, the cross seam only mode, or a dual tracking mode, as explained in greater detail in the referenced application. In the event that corrections are to be made to the vertical spacing of the electrode with respect to the workpiece, such computations and corrections are made in the subroutine. Upon exit from the subroutine, the program flow returns to decision block 461.

At 461, the system tests to determine the mode in which the edge proximity signal and the detection of the edge are to be accomplished. It will be recalled from the discussion above that the edge proximity signal can be generated either when the electrode has reached a predetermined lateral distance from the last-known center of oscillation reference point. An alternative mode is to generate the edge proximity signal by processing the real-time arc voltage or current signals and comparing these signals to predetermined values in order to determine when the edge is approaching. In particular, and in the preferred embodiment, when the arc signal average $V_{AVG}(n)$ exceeds a predetermined value, such as u in FIG. 3, the edge is indicated as approaching. As observed in FIG. 3, and as has been discovered, the predetermined level of voltage u is typically reached for edge joints prior to the point at which the electrode is positioned over the edge at $x_{MAX}$.

Thus, if the latter or real-time edge detection mode is desired, the program goes to 462, and $V_{AVG}$ is compared to the predetermined value u. If $V_{AVG}$ is greater than u, the program goes to block 464.

At 464, the edge proximity signal is produced, and welding parameters (such as welding current and rate of wire feed) are reduced and maintained in this reduced mode until the electrode has reached the edge and returned towards the center.

Alternatively at 461, if the real-time edge detection mode is not selected, the program goes to 463. In this mode, the edge proximity signal is generated and the welding parameters reduced when the x position of the electrode has reached a predetermined distance k past the center reference point. Thus, at 463, the absolute value of the x position is compared to the last known edge position, $x_{MAX}$, less the predetermined distance k. If the x position is greater than $x_{MAX}-k$, it is appropriate to reduce the welding current and other overlay parameters because the approach of the edge is imminent. The program flow then goes to 464 for generation of the edge proximity signal and parameter adjustment.

Upon exit from block 464, the program flow returns to point A and block 445, and the electrode is moved another lateral step. Additionally, if in the real-time edge detection mode the predetermined value of u has not been exceeded in the voltage average $V_{AVG}$, or in the alternative mode, the electrode has not approached within the predetermined distance $x_{MAX}-k$ towards the edge, the flow returns to point A and block 445.

If at blocks 448 or 449 the min arc or max arc has been detected, the program goes to block 470. If the min arc has been detected, it is appropriate to trigger subroutines for vertical correction or other remedial action, since for some reason the electrode has approached too closely to the workpiece.

If the max arc has been detected, it is indicated that the electrode is positioned over the edge of the workpiece or sufficiently close to the edge that further lateral movement is not desirable. Thus, it is appropriate to compute a new centerline of oscillation (if there has been taken sufficient data for both leftward and rightward movements), and also to compute a new value for k if the real-time edge detection mode is not employed. A new value of k may be desirable if, for example, the workpiece has been detected as narrowing over earlier portions of the workpiece, so that a smaller predetermined value of k is desirable.

At 471, the direction of oscillation is reversed, and the next movement of the electrode laterally is in the opposite direction.

Thus, it will now be understood that when the electrode exceeds the predetermined distance k from the centerline and approaches the edge, parameters related to overlay height are reduced. It will also be understood that when the edge has been detected as approaching either because the $V_{AVG}$ exceeds the predetermined value u, because of the detection of the max arc, or because of computations made in template matching or sidewall matching, the electrode has been detected as approaching within a second predetermined distance from the edge. This second predetermined distance is the maximum distance away from the centerline of oscillation, that is, the maximum distance away from the edge of the workpiece that is desirable. Then, it is appropriate to change the direction of movement of the electrode so as to maintain the oscillation width of the electrode between the edges of the workpiece.

At 472, the inquiry is made whether there has been completed one full oscillation, such as shown in FIG. 3 from position 12 to position 12', back to position 12 and thence to position 12''. If not, the program then returns to point A and the lateral movement continued, it being indicated that as yet there is incomplete data for the present oscillation.

At 473, if one full oscillation is complete, there is now in computer memory the data pertaining to one complete lateral scan or oscillation of the electrode across the surface of the workpiece. A workpiece profile signal S(x) which represents the lateral topography of the workpiece for the oscillation just completed is now stored in computer memory. Such data may be transmitted to the host computer or may be used as the basis for comparisons to a template or of opposite sides of the workpiece, as for example in the referenced and incorporated patent applications.

At 474, routines may now be executed for mode determination (such as vertical only, cross seam only, dual tracking, etc.), or routines for tracking signal processing, vertical signal processing, the computation of correction values, and the like. Such signal processing and other routines may be executed wherein centerline tracking of the electrode along the workpiece is performed by template matching or sidewall matching as disclosed in the incorporated referenced patent applications. Reference is made to these copending applications for discussion of methods and flow diagrams for adaptive tracking by template matching or sidewall matching.

Upon exit from these signal processing subroutines, there will be made available by the computer lateral adjustments to the location of the centerline of oscillation $x_0$ of the electrode. Tracking adjustments and scaling thereof, and vertical corrections are then made based upon initial scan parameters as provided at the start of the program. In particular, since many edge joints of turbine blades will be relatively narrow, thereby resulting in fewer data samples than in the welding of conventional seams, corrections to the vertical spacing of the electrode may be made on alternate oscillations with corrections to the centerline of oscillation. Such techniques are taught and described as the "dual tracking" mode in the copending and referenced patent applications.

Finally, it will be understood that the welding current, wire feed rate, or other overlay parameters are maintained at reduced levels until the electrode has returned from the edge towards the centerline and appropriate software tests are made, such as in the real-time edge detection mode wherein $V_{AVG}$ falls below the predetermined level u, or in the alternative mode wherein the x position of the electrode is within the predetermined distance k from the center $x_0$.

It will now be appreciated that there has been disclosed an improvement for arc welding apparatus including means for sensing at least a portion of the lateral profile of an edge joint workpiece while the electrode is moving laterally across the workpiece, adaptive tracking control means responsive to the sensed lateral profile for controlling the position of the welding electrode as the electrode is moved along the workpiece, and means responsive to the sensed lateral profile for adjusting welding parameters related to the overlay height of the weld when the electrode reaches a predetermined lateral distance from the center of oscillation, and therefore a predetermined lateral distance from the edge of the workpiece. It will also be appreciated that the disclosed embodiment allows control of parameters related to the height of the overlay as well as control over parameters of the welding arc which might cause expulsion of weld material or melting over of the edge of the workpiece as the electrode approaches the edge of the workpiece.

It will also be appreciated and understood that there has been disclosed a method and apparatus for welding a convex surface on a workpiece such a turbine blade by moving an arc electrode along a path on the surface of the workpiece, measuring a parameter of arc and providing an arc signal having a magnitude related to the vertical distance between the electrode and the surface of the workpiece as the electrode is moved along the path, repeatedly storing in a memory a plurality of samples of the arc signal corresponding to a predetermined portion of the path of the electrode, detecting when the electrode has been moved along the path to a predetermined distance from an edge of the workpiece, reducing the welding current and other parameters related to overlay height while the electrode exceeds the predetermined distance and approaches the edge so as to prevent melting over of the edge and excessive build up along the edge, processing the samples of the arc signal so as to determine when the electrode has approached to within a second predetermined distance from the edge, and then changing the direction of movement of the electrode along the path so as to maintain the oscillation width of the electrode between the edges of the workpiece.

Finally, it will be understood that the preferred embodiment of the present invention has been disclosed by way of example and that other modifications and alterations may occur to those skilled in the art without departing from the scope and spirit of the appended claims.

What is claimed is:

1. In an apparatus for arc welding a workpiece, the apparatus including arc moving means for oscillating an electrode laterally across the workpiece about a center reference point and for moving the electrode longitudinally along the workpiece, an improvement for welding an edge joint on the workpiece, comprising:

means for sensing at least a portion of the lateral profile of the edge joint while the electrode is moving laterally across the edge joint by obtaining data representative of the edge joint;

means responsive to said representative edge joint data for providing an edge proximity signal upon the detection of the approach of a lateral edge of the edge joint;

means responsive to said edge proximity signal for adjusting a welding parameter related to the fill height of the weld when the electrode reaches a predetermined lateral distance from the lateral edge of the edge joint; and adaptive tracking control means responsive to said representative edge joint data for adjusting the center of oscillation of the electrode as the electrode is moved longitudinally along the edge joint.

2. The improvement of claim 1, wherein said welding parameter is the welding current, and wherein said adjusting means reduces the welding current to prevent melting the edges of the workpiece.

3. The improvement of claim 1, wherein said welding parameter is the rate of feed of a consumable wire, and wherein said adjusting means reduces the rate of feed to reduce the fill height towards the lateral edges of the edge joint.

4. The improvement of claim 1, wherein the center of oscillation of the electrode is maintained by said adaptive tracking control means substantially along the center of the edge joint as the electrode is moved longitudinally along the edge joint.

5. In an apparatus for arc welding a workpiece, the apparatus including arc moving means for oscillating an electrode laterally across the workpiece about a predetermined center reference point, an improvement for welding an edge joint on the workpiece, comprising:

noncontacting means for sensing the lateral profile of edge joint while the electrode is moving laterally across the edge joint and for obtaining data representative of the edge joint profile;

means for comparing at least a portion of said representative edge joint data to reference data and for providing an error signal as a function of the difference between said representative edge joint data and said reference data;

control means responsive to said error signal for adjusting a first welding parameter related to the position of the electrode with respect to the edge joint;

means responsive to said representative edge joint data for providing an edge proximity signal upon the detection of the approach of a lateral edge of the edge joint; and adjusting means responsive to said edge proximity signal for adjusting a second welding parameter related to the fill height of the weld during the lateral movement of the electrode toward said lateral edge.

6. The improvement of claim 5, wherein said first welding parameter is the location of the center reference point, and wherein said control means adjusts the location of the center reference point to maintain the center of oscillation substantially along the center of the edge joint as the electrode is moved longitudinally along the edge joint.

7. The improvement of claim 5, wherein said first welding parameter is the width of oscillation of the electrode, and wherein said control means reverses the lateral movement of the electrode toward said lateral edge when the electrode has reached a predetermined lateral distance from said lateral edge.

8. The improvement of claim 5, wherein said second welding parameter comprises the welding current, and wherein said adjusting means reduces the welding current to a nondestructive level in response to said edge proximity signal to prevent melting of the edge of the workpiece.

9. The improvement of claim 6, wherein said second welding parameter comprises the rate of feed of a consumable wire, and wherein said adjusting means reduces said rate of feed to reduce the fill height toward said lateral edge.

10. The improvement of claim 5, wherein said adjusting means adjusts said second welding parameter while the electrode is moved during an oscillation beyond a predetermined lateral distance from the center reference point towards said lateral edge and until the electrode has returned to said predetermined lateral distance.

11. In an apparatus for arc welding a workpiece, the apparatus including arc moving means for oscillating an electrode laterally across the surface of a workpiece about a center reference point and for moving the electrode longitudinally along the workpiece, the electrode moving along a path on the surface of the workpiece defined by projecting a line from the end of the electrode to intersect perpendicularly with a point on the surface, an improvement for welding an edge joint on the workpiece, comprising:

means for measuring a parameter of the welding arc and for providing an arc signal having a magnitude related to the vertical distance between the electrode and the surface of the edge joint by periodically holding the electrode vertically stationary as the electrode is moved laterally across the edge joint;

memory means for storing a plurality of samples of said arc signal corresponding to a predetermined portion of the path;

edge detecting means responsive to said stored arc signal samples for detecting a lateral edge of the edge joint;

means for detecting when the electrode has been moved along the path to a predetermined lateral distance from a lateral edge of the workpiece detected by said detecting means and for providing an edge proximity signal;

means responsive to said edge proximity signal for adjusting a welding parameter related to the fill height of the weld while the electrode is within said predetermined distance and approaches said detected lateral edge; and signal processing means responsive to said stored arc signal samples for changing the lateral direction of movement of electrode along the path when the electrode approaches to within a second predetermined lateral distance from said detected lateral edge.

12. The improvement of claim 11, wherein the welding parameter adjusted by said adjusting means comprises reducing the welding current to prevent melting of the edge of the workpiece.

13. The improvement of claim 11, wherein the welding parameter adjusted by said adjusting means comprises reducing the rate of feed of a consumable welding wire.

14. The improvement of claim 11, wherein the welding parameter adjusted by said adjusting means comprises adjusting the flow of a welding gas.

15. The improvement of claim 11, further comprising means for sensing the lateral profile of the workpiece and for providing a sensed lateral profile signal comprising a plurality of samples of said arc signal.

16. The improvement of claim 11, wherein said signal processing means adjusts the location of said center reference point in relation to an error signal, said error signal being related to the difference between a first portion of said stored arc signal samples and a second portion of said stored arc signal samples.

17. The improvement of claim 16, wherein one portion of said stored arc signal samples is related to the leftward lateral half of the edge joint and wherein the other portion is related to the rightward lateral half of the edge joint.

18. The improvement of claim 11, wherein said signal processing means adjusts the location of said center reference point in relation to an error signal, said error signal being related to a mathematical criterion of the degree of match between said stored arc signal samples and prestored template data, said template data corresponding to a predetermined idealized lateral profile of the edge joint.

19. The improvement of claim 18, wherein said signal processing means compares said stored arc signal samples to each one of a plurality of sets of template data, each one of said sets of template data corresponding to the lateral profile expected for a different idealized edge joint.

20. A method for welding an edge joint on a workpiece such as a turbine blade or the like, comprising the steps of:

moving an arc electrode along a path on the surface of the edge joint, said path defined by projecting a line from the end of the electrode to intersect perpendicularly with a point on the surface;

periodically holding the electrode vertically stationary while the electrode is moved laterally across the edge joint;

while the electrode is held vertically stationary, measuring a parameter of the arc and providing an arc signal having a magnitude related to the vertical distance between the electrode and the surface of the edge joint as the electrode is moved along the path;

repeatedly storing in a memory plurality of samples of the arc signal corresponding to a predetermined portion of the path of the electrode;

detecting an edge of the edge joint by comparing the stored arc signal samples to a reference value;

detecting when the electrode has been moved along the path to a predetermined distance from the detected edge of the edge joint;

reducing the welding current provided to the electrode while the electrode is within said predetermined distance and approaches the detected edge to prevent melting of the edge;

processing the stored samples of the arc signal so as to determine when the electrode has approached to within a second predetermined distance from the detected edge; and changing the direction of movement of the electrode along the path when the electrode has approached to within said second predetermined distance.

21. The method of claim 20, wherein the step of moving the electrode along the path comprises oscillating the electrode about a nominal centerline as the electrode is moved along the surface of the workpiece.

22. The method of claim 21, further comprising the steps of adjusting the location of the nominal centerline of oscillation in response to the detected edges of the workpiece.

23. The method of claim 20, further comprising the step of reducing the rate of feed of a consumable welding wire while the electrode exceeds said predetermined distance and approaches the edge of the workpiece.

24. The method of claim 20, further comprising the step of adjusting the flow of a welding gas while the electrode is moved beyond said predetermined distance and approaches the edge of the workpiece.

25. In an apparatus for arc welding a workpiece, the apparatus including arc moving means for oscillating an electrode laterally across the surface of a workpiece about a center reference point and for moving the electrode longitudinally along the workpiece, the electrode moving along a path on the surface of the workpiece defined by projecting a line from the end of the electrode to intersect perpendicularly with a point on the surface, an improvement for welding an edge joint on the workpiece, comprising:

means for measuring a parameter of the welding arc and for providing an arc signal having a magnitude related to the vertical distance between the electrode and the surface of the edge joint by periodically holding the electrode vertically stationary as the electrode is moved laterally across the edge joint;

memory means for storing a plurality of samples of said arc signal corresponding to a predetermined portion of the path;

edge detecting means responsive to said stored arc signal samples for detecting a lateral edge of the edge joint and for providing an edge proximity signal;

means responsive to said edge proximity signal for adjusting a welding parameter related to the fill height of the weld while the electrode is within a predetermined distance from a detected lateral edge; and signal processing means responsive to said stored arc signal samples for changing the lateral direction of movement of the electrode.

26. The improvement of claim 25, wherein the welding parameter adjusted by said adjusting means comprises reducing the welding current to prevent melting of the edge of the workpiece.

27. The improvement of claim 25, wherein the welding parameter adjusted by said adjusting means comprises reducing the rate of feed of a consumable welding wire.

28. The improvement of claim 25, wherein the welding parameter adjusted by said adjusting means comprises adjusting the flow of a welding gas.

29. The improvement of claim 25, wherein said signal processing means adjusts the location of said center reference point in relation to an error signal, said error signal being related to the difference between a first portion of said stored arc signal samples and a second portion of said stored arc signal samples.

30. The improvement of claim 29, wherein one portion of said stored arc signal samples is related to the leftward lateral half of the edge joint and wherein the other portion is related to the rightward lateral half of the edge joint.

31. The improvement of claim 25, wherein said signal processing means adjusts the location of said center reference point in relation to an error signal, said error signal being related to a mathematical criterion of the degree of match between said stored arc signal samples and prestored template data, said template data corresponding to a predetermined idealized lateral profile of the edge point.

32. The improvement of claim 31, wherein said signal processing means compares said stored arc signal samples to each one of a plurality of sets of template data, each one of said sets of template data corresponding to the lateral profile expected for a different idealized edge joint.

33. In an apparatus for arc welding a workpiece, the apparatus including arc moving means for oscillating an electrode laterally across the surface of a workpiece about a center reference point and for moving the electrode longitudinally along the workpiece, the electrode moving along a path on the surface of the workpiece defined by projecting a line from the end of the electrode to intersect perpendicularly with a point on the surface, the improvement comprising:

means for measuring a parameter of the welding arc and for providing an arc signal having a magnitude related to the vertical distance between the electrode and the surface of the workpiece;

memory means for storing a plurality of samples of said arc signal corresponding to a predetermined portion of the path;

means for sensing the lateral profile of the workpiece and for providing a sensed lateral profile signal comprising a plurality of samples of said arc signal;

means for detecting when the electrode has been moved along the path to a first predetermined distance from a previously-detected edge of the workpiece and for providing an edge proximity signal;

means for responsive to said edge proximity signal for adjusting a welding parameter while the electrode exceeds said first predetermined distance and approaches the edge of the workpiece; and signal processing means responsive to said arc signal for adjusting the location of said center reference point and for changing the direction of movement of the electrode along the path when the electrode approaches to within a second predetermined distance from the edge of the workpiece, said signal processing means further responsive for adjusting the location of said center reference point in relation to an error signal, said error signal being related to a mathematical criterion of the degree of match between said lateral profile signal and a template signal, said template signal corresponding to a predetermined idealized lateral profile of the workpiece, and said signal processing means further responsive for comparing said lateral profile signal to each one of a plurality of discrete template signals, each of said template signals corresponding to the lateral profile signal expected for a particular center of oscillation of the electrode and a particular width of oscillation about said particular center.

* * * * *

UNITED STATES PATENT AND TRADEMARK OFFICE
CERTIFICATE OF CORRECTION

PATENT NO. : 4,544,825

DATED : Oct. 1, 1985

INVENTOR(S) : George E. Cook

It is certified that error appears in the above-identified patent and that said Letters Patent is hereby corrected as shown below:

Column 1, line 56, change "case" to --cast--.

Column 7, line 53, change "not" to --now--.

Column 7, line 58, change "large" to --larger--.

Signed and Sealed this

*Twenty-seventh* Day of *May 1986*

[SEAL]

*Attest:*

DONALD J. QUIGG

*Attesting Officer* *Commissioner of Patents and Trademarks*